US012801288B2

(12) United States Patent
Wu et al.

(10) Patent No.: US 12,801,288 B2
(45) Date of Patent: Nov. 17, 2026

(54) METHOD AND DEVICE FOR BACKEND WEAR LEVEL BALANCING OF SEPARATED STORAGE DOMAINS

(71) Applicant: Samsung Electronics Co., Ltd., Gyeonggi-do (KR)

(72) Inventors: Chun-Chu Chen-Jhy Archie Wu, San Carlos, CA (US); Daniel Lee Helmick, Erie, CO (US); Daniel John Benjamin, Savage, MN (US); Vipin Kumar Agrawal, San Jose, CA (US)

(73) Assignee: Samsung Electronics Co., Ltd (KR)

( * ) Notice: Subject to any disclaimer, the term of this patent is extended or adjusted under 35 U.S.C. 154(b) by 22 days.

(21) Appl. No.: 19/084,159

(22) Filed: Mar. 19, 2025

(65) Prior Publication Data

US 2025/0328252 A1 Oct. 23, 2025

Related U.S. Application Data

(60) Provisional application No. 63/637,643, filed on Apr. 23, 2024, provisional application No. 63/637,672, filed on Apr. 23, 2024.

(51) Int. Cl.
*G06F 3/06* (2006.01)

(52) U.S. Cl.
CPC .......... *G06F 3/0616* (2013.01); *G06F 3/0659* (2013.01); *G06F 3/0679* (2013.01)

(58) Field of Classification Search
None
See application file for complete search history.

(56) References Cited

U.S. PATENT DOCUMENTS

| | | | | |
|---|---|---|---|---|
| 6,000,006 | A | 12/1999 | Bruce et al. | |
| 9,110,830 | B2 | 8/2015 | Dieffenderfer et al. | |
| 9,389,792 | B1 * | 7/2016 | Camp | G06F 3/0652 |
| 9,830,087 | B2 | 11/2017 | Fontana et al. | |
| 10,592,427 | B2 | 3/2020 | Balluchi et al. | |
| 10,922,221 | B2 | 2/2021 | McGlaughlin et al. | |
| 11,086,775 | B2 * | 8/2021 | Kanno | G06F 3/064 |
| 11,249,664 | B2 | 2/2022 | Hahn et al. | |
| 11,360,144 | B2 | 6/2022 | Zenati et al. | |
| 11,550,585 | B2 | 1/2023 | Rusitoru et al. | |

(Continued)

FOREIGN PATENT DOCUMENTS

| | | |
|---|---|---|
| CN | 114063934 | 11/2023 |
| EP | 4 053 704 | 9/2022 |
| EP | 4 064 022 | 9/2022 |

OTHER PUBLICATIONS

European Search Report dated Sep. 8, 2025 issued in counterpart application No. 25170669.3-1218, 14 pages.

*Primary Examiner* — Khoa D Doan

(74) *Attorney, Agent, or Firm* — The Farrell Law Firm, P.C.

(57) ABSTRACT

Methods and devices are provided in which a controller of a storage device receives a command. A logical capacity of the storage device is split into domains. The controller determines a logical address associated with the command. The logical address is associated with a first domain of the storage device. The command is rerouted from first resources of the controller attributed to the first domain to second resources of the controller attributed to a second domain of the storage device, based on a physical address associated with the logical address.

20 Claims, 9 Drawing Sheets

(56) References Cited

U.S. PATENT DOCUMENTS

| | | | |
|---|---|---|---|
| 11,861,223 | B2 | 1/2024 | Na |
| 2016/0048459 | A1 | 2/2016 | Oh et al. |
| 2020/0125487 | A1 | 4/2020 | Kanno et al. |
| 2021/0012844 | A1 | 1/2021 | Gough et al. |
| 2021/0406169 | A1 | 12/2021 | Minopoli et al. |
| 2022/0137998 | A1 | 5/2022 | Kim et al. |
| 2023/0027329 | A1 | 1/2023 | Durham et al. |
| 2023/0229599 | A1 | 7/2023 | Dearth et al. |
| 2023/0298129 | A1 | 9/2023 | Puffer et al. |
| 2024/0354257 | A1* | 10/2024 | Prakash .............. G06F 12/0822 |

* cited by examiner

METHOD AND DEVICE FOR BACKEND WEAR LEVEL BALANCING OF SEPARATED STORAGE DOMAINS

PRIORITY

This application is based on and claims priority under 35 U.S.C. § 119 (e) to U.S. Provisional Patent Application Ser. No. 63/637,643, filed on Apr. 23, 2024, and U.S. Provisional Patent Application Ser. No. 63/637,672, filed on Apr. 23, 2024, the entire contents of which are incorporated herein by reference.

TECHNICAL AREA

The present disclosure relates generally to data storage management systems, and more particularly, to a method for storage domain wear level balancing in a data storage management system.

BACKGROUND

The present background section is intended to provide context only, and the disclosure of any concept in this section does not constitute an admission that said concept is prior art.

Complexities in data storage management continue to grow with increasing computational demand. The computational demand may be demonstrated through an increase in commands (e.g., read commands, write commands, or copy commands), issued by a host and inserted into a data storage management system for execution.

Solid state drives (SSD) may have domains that split the SSD into a number of distinct identical backends that each manage a respective subset of the total drive logical capacity over a respective subset of the drive physical capacity (e.g., four to eight domains of NAND management). Each domain has a smaller physical capacity than the full drive, and the addressing size for each logical page number (LPN) may be reduced to only what is available to that domain. Since these domains are separately managed, they do not have any knowledge or control of the other domains.

If user workload decreases, traffic may not be evenly distributed across the domains, and the lifetime of the full drive may be shortened to the lifetime of the most worn domain. Global wear leveling splits work evenly such that each domain would reach end of life endurance at the same time. However, such a split between domains may not address different traffic conditions, and it is not flexible if the uneven traffic distribution changes. Additionally, the movement and excess logical block addresses (LBAs) may not be tracked, and it may not be clear how much data a target domain can support.

SUMMARY

According to an embodiment, a method is provided in which a controller of a storage device receives a command. A logical capacity of the storage device is split into domains. The controller determines a logical address associated with the command. The logical address is associated with a first domain of the storage device. The command is rerouted from first resources of the controller attributed to the first domain to second resources of the controller attributed to a second domain of the storage device, based on a physical address associated with the logical address.

According to this embodiment, the physical address may be an invalid physical page number (PPN) retrieved from a first logical-to-physical (L2P) look-up table (LUT) of the first domain. Rerouting the command may include rerouting an LPN from the first L2P LUT to a second L2P LUT of the second domain. The first domain may have more wear than the second domain.

According to this embodiment, an L2P reroute table may be configured with portions of L2P LUT entries that are unused in defining PPNs. The L2P reroute table may track the LPNs routed from the first L2P LUT to the second L2P LUT. The LPNs may be indicated as rerouted by a flag that enables the second resources of the controller attributed to the second domain to retrieve a physical location from the L2P reroute table.

According to this embodiment, the command may include a read command routed to the first resources of the controller attributed to the first domain, and performing the read command may include determining, based on the read command, that a PPN value from the first L2P LUT is invalid. An offset in the L2P reroute table may be determined by subtracting a last valid PPN value in the first domain from the PPN value. A new PPN value may be determined based on the offset in the L2P reroute table. The new PPN value may be a physical location in the second domain.

According to this embodiment, the command may include a garbage collection command routed to the first resources of the controller attributed to the first domain, and performing the garbage college command may include triggering garbage collection across a superblock of the first domain. Valid LPNs are read and written to a new superblock. L2P information in the first L2P LUT and the L2P reroute table is updated.

According to this embodiment, the command may include a write command routed to the first resources of the controller attributed to the first domain, and data of the write command may be buffered. Based on the write command, it may be determined that a PPN value from the first L2P LUT indicates rerouting to the second domain and a physical location in the second domain. The write command and the buffered data may be sent to the second resources of the controller attributed to the second domain.

Alternatively, according to this embodiment, when the command includes a write command routed to the first resources of the controller attributed to the first domain, data of the write command may be buffered, and a physical location indicated in the first L2P LUT may be invalidated based on the write command. The physical location may be updated based on a value of the L2P reroute table. A temporary value may be attributed to the L2P reroute table that points to the buffered data of the write command. The write command and the temporary value may be passed from the first resources of the controller attributed to the first domain to the second resources of the controller attributed to the second domain. The write command may be performed by sending the buffered data to the second resources of the controller attributed to the second domain. The temporary value of the L2P reroute table may be changed to a physical location of the data in the second domain.

According to this embodiment, a redirect L2P LUT may be configured. Performing the command may include concurrent use of the first L2P LUT and the redirect L2P LUT. A first PPN entry of the first L2P LUT may include at least a first cross domain ID identifying cross domain access to the second domain. A second PPN entry of the first L2P LUT may include a second cross domain ID identifying cross domain access to a third domain of the domains. A hash function may be performed on an LPN of the command to scale down the LPN for an entry of the redirect L2P LUT.

According to this embodiment, the first resources may include first hardware and firmware resources dedicated to the first domain, and the second resources may include separate second hardware and firmware resources dedicated to the second domain. Alternatively, the first resources and the second resources may include hardware and firmware resources used on a rotating basis between the first domain and the second domain.

According to an embodiment, a storage device is provided that includes a controller and a non-transitory computer readable storage medium having a logical capacity split into domains and storing instructions. When executed, the instructions cause the controller to receive a command and determine a logical address associated with the command. The logical address is associated with a first domain. The instructions also cause the controller to reroute the command from first resources of the controller attributed to the first domain to second resources of the controller attributed to a second domain, based on a physical address associated with the logical address.

According to this embodiment, the physical address may be an invalid PPN retrieved from a first L2P LUT of the first domain. Rerouting the command may include rerouting an LPN from the first L2P LUT to a second L2P LUT of the second domain. The first domain may have more wear than the second domain.

According to this embodiment, an L2P reroute table may be configured with portions of L2P LUT entries that are unused in defining PPNs. The L2P reroute table tracks the LPNs routed from the first L2P LUT to the second L2P LUT. The LPNs may be indicated as rerouted by a flag that enables the second resources of the controller attributed to the second domain to retrieve a physical location from the L2P reroute table.

According to this embodiment, a redirect L2P LUT may be configured. Performing the command may include concurrent use of the first L2P LUT and the redirect L2P LUT. A first PPN entry of the first L2P LUT may include a first cross domain ID identifying cross domain access to the second domain. A second PPN entry of the first L2P LUT may include a second cross domain ID identifying cross domain access to a third domain of the domains. A hash function may be performed on an LPN of the command to scale down the LPN for an entry of the redirect L2P LUT.

BRIEF DESCRIPTION OF THE DRAWINGS

The drawings described below are examples of how embodiments of the disclosure may be implemented, and are not intended to limit embodiments of the disclosure. Individual embodiments of the disclosure may include elements not shown in particular figures and/or may omit elements shown in particular figures. The drawings are intended to provide illustration and may not be to scale. The above and other aspects, features, and advantages of certain embodiments of the present disclosure will be more apparent from the following detailed description, taken in conjunction with the accompanying drawings, in which.

DETAILED DESCRIPTION

Figure 1:
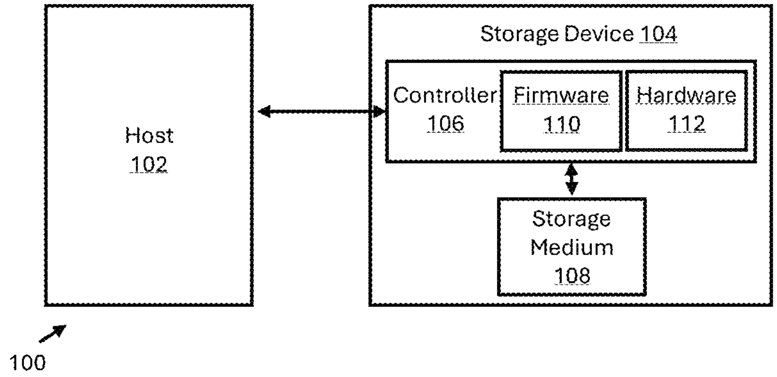
FIG. 1 is a diagram illustrating a data storage management system for processing commands in an electronic device, according to an embodiment.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "1$^{st}$," "2$^{nd}$," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, firmware, or combination thereof, and may interchangeably be used with other terms, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC), a co-processor, or field programmable gate arrays (FPGAs).

An electronic device, according to one embodiment, may be one of various types of electronic devices utilizing storage devices (e.g., memory devices). The electronic device may use any suitable storage standard, such as, for example, peripheral component interconnect express (PCIe), nonvolatile memory express (NVMe), NVMe-over-fabric (NVMeoF), advanced extensible interface (AXI), ultra path interconnect (UPI), ethernet, transmission control protocol/Internet protocol (TCP/IP), remote direct memory access (RDMA), RDMA over converged ethernet (ROCE), fibre channel (FC), infiniband (IB), serial advanced technology attachment (SATA), small computer systems interface (SCSI), serial attached SCSI (SAS), Internet wide-area RDMA protocol (iWARP), and/or the like, or any combination thereof. In some embodiments, an interconnect interface may be implemented with one or more memory semantic and/or memory coherent interfaces and/or protocols including one or more compute express link (CXL) protocols such as CXL.mem, CXL.io, and/or CXL.cache, Gen-Z, coherent accelerator processor interface (CAPI), cache coherent interconnect for accelerators (CCIX), and/or the like, or any combination thereof. Any of the memory devices may be implemented with one or more of any type of memory device interface including double data rate (DDR), DDR2, DDR3, DDR4, DDR5, low-power DDR (LPDDRX), open memory interface (OMI), Nvlink high bandwidth memory (HBM), HBM2, HBM3, and/or the like. The electronic devices may include, for example, a portable communication device (e.g., a smart phone), a computer, a portable multimedia device, a portable medical device, a camera, a wearable device, or a home appliance. However, an electronic device is not limited to those described above.

FIG. 1 is a diagram illustrating a data storage management system for processing commands in an electronic device, according to an embodiment. In data storage management, commands may be issued by a host and carried out in a data storage device. A destination address (e.g., a logical page number (LPN)) is in the storage address space of the data storage device. An LPN may be the result of a namespace (NS) multiplexed with a logical block address (LBA). Each NS has a series of LBAs, and each NS may have a different number of LBAs (and therefore a different capacity). A drive translates the [NS, LBA] pair into a globally unique LPN within the drive.

A storage system 100 includes a host 102 and a storage device 104 (e.g., a memory device). Although one host and one storage device are depicted, the storage system 100 may include multiple hosts and/or multiple storage devices. The storage device 104 may be a hard disk drive (HDD), a solid state drive (SSD), a universal flash storage (UFS), etc. The storage device 104 may include a controller 106 and a storage medium 108 connected to the controller 106. The controller 106 may be an HDD controller, an SSD controller, a UFS controller, etc. The controller 106 may be tailored for high-performance storage management and may include multiple processing cores and hardware accelerators. The controller may be implemented in one or more chips on the storage device 104. One or more specialized processing elements (e.g., microcontrollers, digital signal processors, or FPGAs) may accelerate tasks, and may run concurrently to handle command throughput from the host. The storage medium 108 may include a volatile memory, a non-volatile memory, or both, and may include one or more flash memory chips, disk drive platters, a phase-change memory (PCM), a resistive random access memory (ReRAM), a magnetic random access memory (MRAM), or other storage media. The controller 106 may be configured to facilitate transfer of data/commands between the host 102 and the storage medium 108. The host 102 may send data/commands to the storage device 104 to be received by the controller 106 and processed in conjunction with the storage medium 108. A firmware instructions module 110 may be disposed within or coupled directly to the controller 106, and may include firmware instructions stored in a dedicated non-volatile memory section that execute a wear-balancing method. Specifically, the firmware instructions module 110 may monitor domain wear, analyze traffic conditions, and adjust logical-physical mappings based on current wear conditions and traffic. The firmware instructions module 110 may have associated hardware components 112 of the controller 106. The firmware instructions module 110 and associated hardware components 112 may be referred to as resources of the controller 106.

Figure 2:
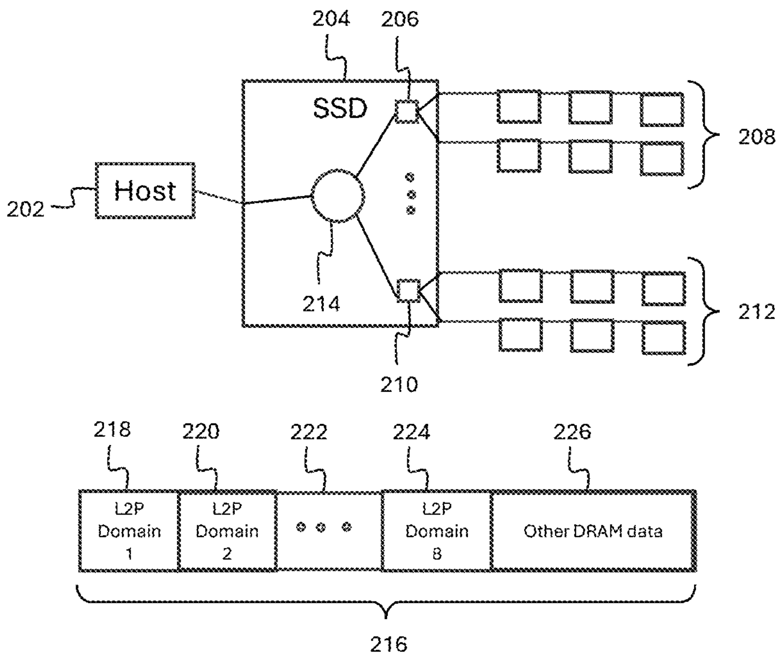
FIG. 2 is a diagram illustrating an SSD configured with multiple domains, according to an embodiment.

FIG. 2 is a diagram illustrating an SSD configured with multiple domains, according to an embodiment. The SSD may be embodied as the storage device 104, as described above with respect to FIG. 1. A host 202 may be in communication with an SSD 204 configured with eight local domains. Each of the local domains includes a set of memory blocks. For example, a first local domain 206 may include a first set of memory blocks 208, and an eighth local domain 210 may include an eighth set of memory blocks 212, with the second through seventh local domains and respective sets of memory blocks therebetween. A controller 214 of the SSD 204 may correspond to the controller 106 of FIG. 1, and may have dedicated hardware, firmware, and processing resources (also generally referred to as "resources") for each local domain. Such dedicated resources may be included in the firmware instructions module 110 and the hardware components 112 of FIG. 1. Alternatively, hardware, firmware, and processing resources of the controller 214 may be shared between local domains and may be attributed to individual local domains on a rotating basis.

A portion of a dynamic random-access memory (DRAM) 216 may be dedicated to store a logical-to-physical (L2P) look-up table (LUT) of each domain. For example, a first portion 218 of the DRAM 216 is for an L2P LUT of the first local domain 206, a second portion 220 of the DRAM 216 is for an L2P LUT of a second local domain, second through seventh portions 222 of the DRAM 216 are for L2P LUTs of corresponding local domains, an eighth portion 224 of the DRAM 216 is for an L2P LUT of the eighth local domain 210, and a remaining portion 226 of the DRAM 216 is for other DRAM data. A respective L2P LUT may be used to track the physical location of data for that domain by mapping logical addresses to physical addresses. The L2P LUT may also be in a static random access memory (SRAM), a NAND, or split between the DRAM 216 and the NAND. If split between the DRAM 216 and the NAND, the L2P LUT may be cached in portions of the DRAM 216 for short periods of time.

Each globally unique LPN may be routed to a local domain. This routing may be performed through any hashing method. One such hashing method may include execution of a modulo function on a global LPN. With respect to the eight local domains shown in FIG. 2, the global LPN may be divided by eight. The remainder of this division is equal to the modulo eight value. All remainder values of 0 may be routed to the first local domain 206, all remainder values of 1 may be routed to the second local domain, and so on. The global LPN may be right shifted by three bits to ignore the three bits within the local LPN value. This right shift may be used to reduce the number of bits needed to store the local LPN value. The globally unique LPNs may also be addressed by a combination of the domain and the local LPN value.

Each local domain may then be used in an isolated manner, and the controller may perform garbage collection (GC) on all local LPNs within each local domain. In addition to a reduced number of bits on the LPN value within the local domain, each local domain may be allocated a reduced quantity of flash memory. The flash memory may be addressed with physical page numbers (PPNs). Due to the smaller amount of flash within each domain being addressed by local PPN values, an L2P LUT may utilize a reduced number of bits by reducing the width of the PPNs. The local LPNs within each local domain may be placed in the local PPNs for each domain.

Figure 3:
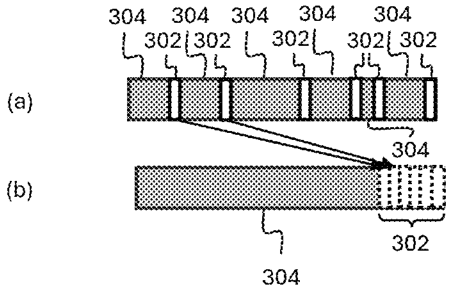
FIG. 3 is a diagram illustrating a PPN address space, according to an embodiment.

FIG. 3 is a diagram illustrating PPN address space, according to an embodiment. A PPN may be contained in a 32-bit address of an L2P LUT entry. The L2P LUT may be stored in DRAM, and the DRAM controller's accesses or DRAM error correction code (ECC) may be optimized for 32-bit accesses. The 32-bit address may have a 4 KiB data granularity, and the L2P LUT may track $2^{32}$ total physical locations or entries, with a maximum physical trackable capacity of 16 TiB per domain. In this example of 32-bit accesses and multiple local domains, if a storage capacity greater than 16 TiB needs to be addressed, multiple domains may be used together to reach these larger capacities while maintaining a PPN size that may fit within the 32-bit constraint.

Within each local domain, subsets of bits within the 32-bit address may be assigned to, for example, chip indices to represent the flash chip within this local domain, plane within this flash chip, erase blocks (EBs) within this plane, word lines (WLs) in this EB, pages within this WL, etc. An unused numbering gap may be present in each subset of bits. For example, PPN definitions may not be expected to use all allotted chips per domain, all allotted blocks per chip, etc. A non-compact embodiment is shown in (a) of FIG. 3, in which unused blocks 302 are interspersed throughout the PPN address space after used addresses 304, thereby creating unassigned numbering gaps across a 32-bit address space. Specifically, the unused blocks 302 may indicate chips, EBs, WLs, and pages that do not exist, and PPNs that correspond to such locations may be invalid. Alternatively, these addressing gaps may be combined into a single gap at the end of a contiguously packed L2P PPN address space.

A compact embodiment is shown in (b) of FIG. 3, in which the unused blocks 302 are disposed after all of the used addresses 304 in the 32-bit address space. As an example of compact numbering, PPN 0 may be assigned to chip-0, plane-0, EB-0, page-0, WL-0, sector-0; PPN 1 may be assigned to chip-1, plane-0, EB-0, page-0, WL-0, sector-0; PPN 2 may be assigned to chip-2, plane-0, EB-0, page-0, WL-0, sector-0, etc. In another example of compact numbering, PPN 0 may be assigned to chip-0, plane-0, EB-0, page-0, WL-0, sector-0; PPN 1 may be assigned to chip-0, plane-0, EB-0, page-0, WL-0, sector-1; PPN 2 may be assigned to chip-0, plane-0, EB-0, page-0, WL-0, sector-2, etc. Accordingly, it may be possible for the meanings of 8.3 TB through 17 TiB to remain unused in a compact $2^{32}$ bitmap definition. Generally, herein, a metric prefix is used for decimal numerals and an International Electromechanical Commission (IEC) prefix is used for binary numerals, avoiding the ambiguity caused by using memory terminology for binary numerals.

Figure 4:
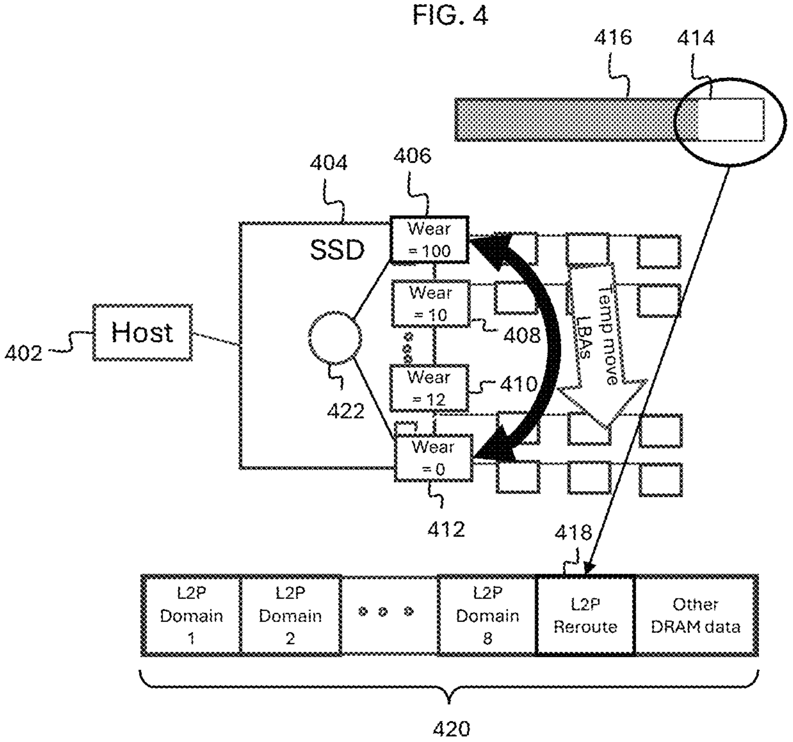
FIG. 4 is a diagram illustrating wear balancing between domains, according to an embodiment.

FIG. 4 is a diagram illustrating wear balancing between local domains, according to an embodiment. The wear between local domains may become imbalanced due to excessive traffic access to a particular local domain or due to that domain being weak or unhealthy. A controller of an SSD may calculate the average wear of a local domain by estimating the remaining number writes that a block can endure, or by estimating a program, read, or erase speed. As shown in FIG. 4, a host 402 is in communication with an SSD 404, which may include a first local domain 406 with a wear of 100, a second local domain 408 with a wear of 10, a seventh local domain 410 with a wear of 12, an eighth local domain 412 with a wear of 0, and third through sixth local domains therebetween. The controller may compare average wear calculation between domains to determine local domains of the SSD with the most wear and the least wear. The amount of life remaining in the local domain with most accumulated wear is less than the amount of life remaining in the local domain with least accumulated wear. Accordingly, it may be beneficial to subsequently attribute more wear (or LPNs) on the local domain with least accumulated wear, and subsequently attribute less wear on the local domain with the most accumulated wear.

A controller 422 may temporarily move LPNs from a most worn local domain (e.g., the first local domain 406) to a least worn domain (e.g., the eighth domain 412). Initially, the two local domains may be globally marked (e.g., movement from domain 1 to domain 8). A numbering gap (unused values) 414 in a 32-bit address space 416, as described above with respect to FIG. 3, may be used to designate use of an L2P reroute table 418 of a DRAM 420. Specifically, invalid values (offsets) within the numbering gap 414 of the 32-bit L2P LUT address space 416 may be used as an array offset in the L2P reroute table 418, in order to reroute a given command to the L2P LUT of the least worn local domain (e.g., the eighth local domain 412). With more data being routed into the eighth local domain 412, over-provisioning (OP) may be reduced and a write amplification factor (WAF) may be increased at the eighth local domain 412. With less data attributed to the first local domain 406, OP may increase and a WAF may be reduced at the first local domain 406. Rebalancing may generally be stronger with respect to increased wear on the least worn local domain in comparison to reduced wear on the most worn local domain.

Figure 5:
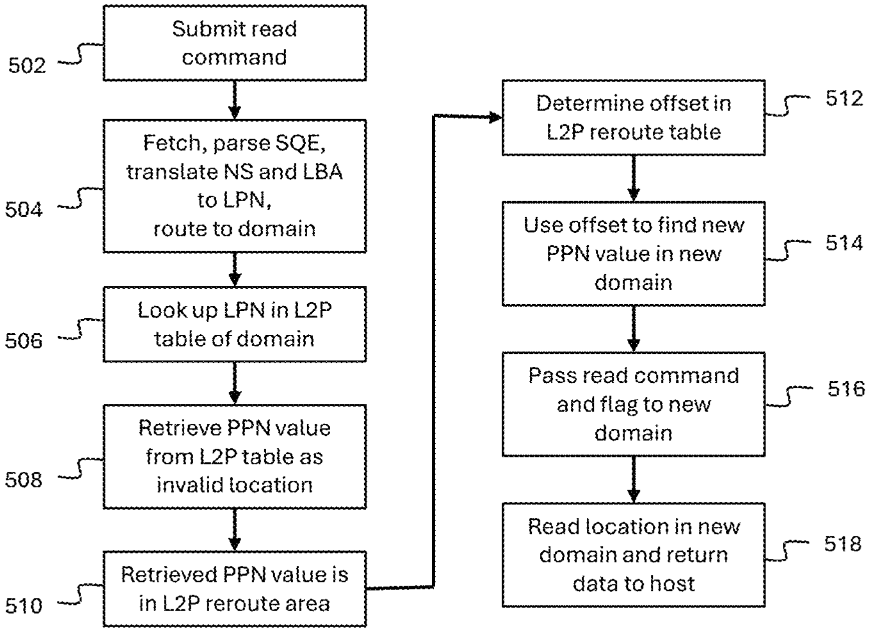
FIG. 5 is a flowchart illustrating domain wear balancing with respect to a read command, according to an embodiment.

FIG. 5 is a flowchart illustrating domain wear balancing with respect to a read command, according to an embodiment. At 502, a host may submit a read command to a drive. For example, with respect to FIG. 2, the host 202 may submit the read command to the SSD 204, or, with respect to FIG. 4, the host 420 may submit the read command to the SSD 404.

At 504, a controller of the drive may fetch and parse a read submission queue entry (SQE), translate NS and LBA to LPN, and route the read command to an originating local domain, as described above with respect to FIG. 2. For example, with respect to FIG. 2, the controller 214 may route the read command to the first local domain 206, or, with respect to FIG. 4, the controller 422 may route the read command to the first local domain 406.

As described above with respect to FIG. 2, a drive controller may have dedicated hardware, firmware, and processing resources (herein after resources) for each local domain. Alternatively, hardware, firmware, and processing resources of the drive controller may be shared between local domains and attributed to individual local domains on a rotating basis. In both cases, such resources may represent a portion of the drive controller, and may correspond to the firmware module 110 and the hardware components 112 of the controller 106 in FIG. 1.

At 506, resources of the drive controller attributed to the originating local domain may look up an LPN corresponding to the read command in an L2P LUT of the originating domain. For example, with respect to FIG. 2, resources of the controller 214 attributed to the first domain 206 may look up an LPN corresponding to the read command in the L2P LUT 218 of the first domain 206, or, with respect to FIG. 4, resources of the controller 422 attributed to the first domain 406 may look up an LPN corresponding to the read command in the L2P LUT of the first domain in the DRAM 420.

At 508, the resources of the drive controller attributed to the originating local domain may determine that a PPN value retrieved from the L2P LUT is an invalid physical location (e.g., unused/unassigned values). For example, with respect to FIG. 2, resources of the controller 214 attributed to the first domain 206 may determine that the PPN value from the L2P LUT 218 is invalid, or, with respect to FIG. 4, resources of the controller 422 attributed to the first domain 406 may determine that the PPN value from the L2P PUT in the DRAM 420 is in valid.

At 510, the resources of the drive controller attributed to the originating local domain may determine that the retrieved PPN value corresponds to an L2P reroute table, and that the LPN was moved from this originating local domain. For example, with respect to FIG. 4, resources of the controller 422 attributed to the first domain 406 may determine that the retrieved PPN value corresponds to the L2P reroute table 418.

At 512, resources of the drive controller attributed to the originating local domain may determine an offset in the L2P reroute table by subtracting a last used/valid PPN value in the originating local domain from the retrieved PPN value. For example, with respect to FIG. 4, resources of the controller 422 attributed to the first domain 406 may determine an offset in the L2P reroute table 418. In the compact numbering scheme for PPNs (e.g., (b) of FIG. 3), the values of PPNs may range from 0 to N. PPN values of N+1 and greater are invalid. N may be subtracted from the invalid PPN value to determine a look-up value for the L2P reroute table.

For a non-compact numbering scheme (e.g., (a) of FIG. 3), a conversion may be required to determine the look-up value for the L2P reroute table. Specifically, knowledge of the gaps within the numbering scheme is required. For example, the first gap may be in a fourth bit of the page (e.g., only three pages exist). With the first four bits being the 4 KiB sector in the 16 KiB page, the binary values for PPNs are:

| |
|---|
| 00 . . . 00 \| page 00 \| sector 00 - valid |
| 00 . . . 00 \| page 00 \| sector 01 - valid |
| 00 . . . 00 \| page 00 \| sector 10 - valid |
| 00 . . . 00 \| page 00 \| sector 11 - valid |
| 00 . . . 00 \| page 01 \| sector 00 - valid |
| 00 . . . 00 \| page 01 \| sector 01 - valid |
| 00 . . . 00 \| page 01 \| sector 10 - valid |
| 00 . . . 00 \| page 01 \| sector 11 - valid |
| 00 . . . 00 \| page 10 \| sector 00 - valid |
| 00 . . . 00 \| page 10 \| sector 01 - valid |
| 00 . . . 00 \| page 10 \| sector 10 - valid |
| 00 . . . 00 \| page 10 \| sector 11 - valid |
| 00 . . . 00 \| page 11 \| sector 00 - invalid |
| 00 . . . 00 \| page 11 \| sector 01 - invalid |
| 00 . . . 00 \| page 11 \| sector 10 - invalid |
| 00 . . . 00 \| page 11 \| sector 11 - invalid |
| 00 . . . 01 \| page 00 \| sector 00 - valid |
| 00 . . . 01 \| page 00 \| sector 01 - valid |
| 00 . . . 01 \| page 00 \| sector 10 - valid |
| 00 . . . 01 \| page 00 \| sector 11 - valid |

The first gap with invalid numbers has four values, and this gap begins at decimal 12 (binary value 1100). 12 is subtracted from the value in the L2P table, resulting in 0, which is used as the look-up value for the L2P reroute table. The next gap may be based on how many WLs there are in each EB.

At 514, resources of the drive controller attributed to either the originating local domain or the receiving local domain may use the offset in the L2P reroute table to find a new PPN value, which is a physical location in the receiving local domain. For example, with respect to FIG. 4, resources of the controller 422 attributed to either the first local domain 406 or the eighth local domain 412 may find a new PPN value using the offset in the L2P reroute table 418. The originating local domain may examine global information, as described above, to determine the correct receiving local domain. For example, the global information in the tracking may indicate that domain 3 has LPNs being rerouted to domain 5, and domain 5 may be checked to find a local PPN within domain 5. The L2P reroute table has meaning in domain 5.

At 516, resources of the drive controller attributed to the originating local domain may redirect the read command and the offset for the L2P reroute table to the receiving local domain with a flag indicating that this is a redirected LPN. Specifically, the flag may provide an indication that the L2P reroute table should be used, and resources of the drive controller attributed to the receiving local domain may look up the physical location in the L2P reroute table. For example, with respect to FIG. 4, resources of the controller 422 attributed to the first local domain 406 may redirect the read command, the offset and the flag to the eighth local domain 412, and resources of the controller 422 attributed to the eighth local domain 412 may look up the physical location. Alternatively, resources of the drive controller attributed to the originating local domain may perform the look-up at the L2P reroute table, and a result from the L2P reroute table may be passed to the receiving local domain.

At 518, resources of the drive controller attributed to the receiving local domain may read the physical location within the receiving local domain and return the requested data to the host. For example, with respect to FIG. 4, resources of the controller 422 attributed to the eighth local domain 412 may read the physical location in the eighth local domain 412 and return the request data to the host 402.

When a host deallocate (or trim) command frees memory or a host overwrites data and invalidates a memory location, GC commands may collect remaining valid data. The valid data may be programmed continuously elsewhere allowing previously sparse space to be erased, and resulting in a contiguous set of space that may accept new incoming data. A typical GC command may process a unit of memory, such as a block, by copying valid data within the unit to new location(s) and then erasing the entire unit so that it becomes available for future write commands. A superblock (SB) is a grouping of blocks from more than one chip (or die). A memory management subsystem may request an erase command for the purpose of GC, and a controller may issue an erase command to an entire superblock, which may be executed across multiple chips (or dies) at once. Upon triggering GC on a SB, SB information may be read, and valid LPNs in the SB may be looked up and read from a NAND based on the SB. Valid LPNs may be compactly written into a new SB. L2P LUT information for LPNs that were moved may be updated.

Two methods may be utilized to move LPNs between domains. In a first method, LPNs may be moved by temporarily pausing processing of commands and moving LPNs between domains in the background. In a second method, select LPNs may be moved as write commands submitted from a host. This second method does not trigger an additional write that is required in the first method.

Figure 6:
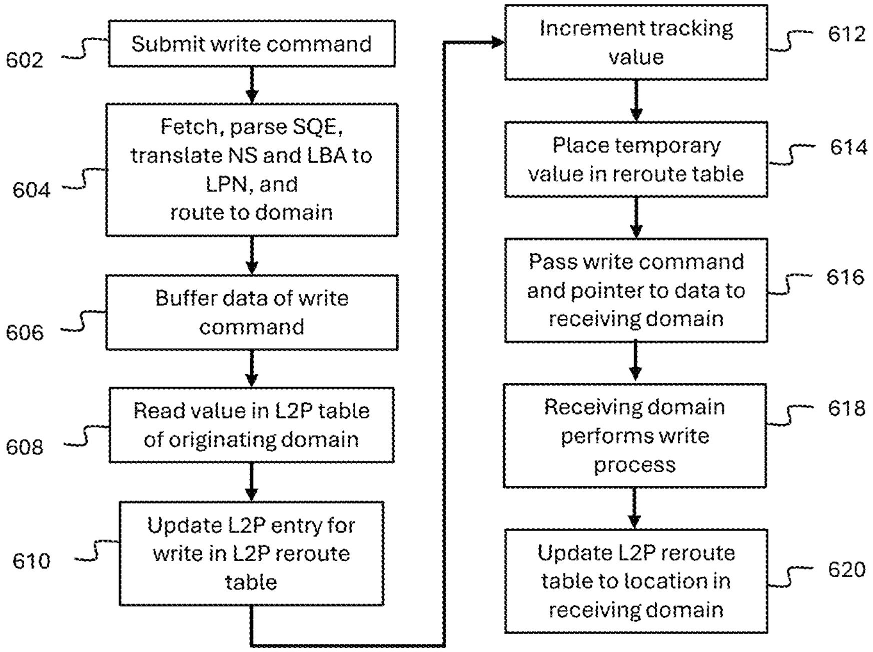
FIG. 6 is a flowchart illustrating domain wear balancing with respect to a write command, according to an embodiment.

FIG. 6 is a flowchart illustrating domain wear balancing with respect to a write command, according to an embodiment. Such an embodiment may apply during a transition period for moving incoming write commands or may apply for write commands to LPNs that have already moved to a receiving domain. A drive may recognize that a domain is wearing too quickly (e.g., originating domain), and another domain that is not wearing quickly may be selected to receive the write command (e.g., receiving domain).

A host may create a write command that would generally be written to the originating local domain (e.g., the first domain 406 of FIG. 4). At 602, the host may submit the write command to the drive. For example, with respect to FIG. 2, the host 202 may submit the write command to the SSD 204, or, with respect to FIG. 4, the host 420 may submit the write command to the SSD 404.

At 604, the drive may fetch and parse a write SQE, translate NS and LBA to LPN, and route the write command to the originating domain. For example, with respect to FIG. 2, the controller 214 may route the write command to the first local domain 206, or, with respect to FIG. 4, the controller 422 may route the write command to the first local domain 406.

As described above with respect to FIG. 2, a drive controller may have dedicated hardware, firmware, and processing resources (herein after resources) for each local domain. Alternatively, hardware, firmware, and processing resources of the drive controller may be shared between local domains and attributed to individual local domains on a rotating basis. In both cases, such resources may represent a portion of the drive controller.

At 606, resources of a drive controller attributed to the originating local domain may buffer incoming data of the write command. For example, with respect to FIG. 2, resources of the controller 214 attributed to the first local domain 206 may buffer the incoming data, or with respect to FIG. 4, resources of the controller 422 attribute to the first local domain 406 may buffer the incoming data.

At 608, resources of the drive controller attributed to the originating local domain may read a current value in the L2P LUT of the originating local domain, thereby looking up a PPN for the LPN. For example, with respect to FIG. 2, resources of the controller 214 attributed to the first local domain 206 may read the value in the L2P LUT 218, or, with respect to FIG. 4, resources of the controller 422 attributed to the first local domain 406 may read the value in the L2P LUT of the first local domain 406 the DRAM 420.

For an established redirection between local domains, the write command is redirected in a manner similar to the read command, as described above with respect to FIG. 4. Specifically, based on the read value, resources of the controller attributed to the originating local domain may determine that the local LPN is rerouted. The resources of the controller attributed to the originating local domain may pass the write command, the L2P reroute offset, and the flag to the resources of the controller attributed to the receiving domain.

However, with respect to the embodiment of FIG. 6, the controller in the originating domain may determine that the local LPN is valid, but the originating domain needs to move L2P values from the originating local domain to the receiving local domain. At, 610, the resources of the controller attributed to the originating local domain may invalidate an existing physical location indicated in the L2P LUT in the originating local domain and update the entry to a value to be used in the L2P reroute table (e.g., a value within the range 16 TiB-8.3 TB). For example, with respect to FIG. 4, the resources of the controller 422 attributed to the first local domain 406 may update an entry of the L2P LUT of the first local domain 406 in the DRAM 420 to an invalid value indicating use of the L2P reroute table 418. Specifically, the controller may determine a next unused value in the L2P reroute table, and may translate this array offset value into a range of invalid gaps of the PPN table values. The new PPN in the L2P reroute table may be determined by the controller in the receiving domain. The resources of the controller attributed to the receiving domain may select a PPN according to normal operation, which may be a next available PPN in the receiving domain for writing.

At 612, the resources of the controller attributed to the originating local domain may increment a tracking value indicating the number addresses within the range for the L2P reroute table (e.g., 16 TiB-8.3 TB) that are used. For example, with respect to FIG. 4, the resources of the controller 422 attributed to the first local domain 406 may increment the tracking value. As rerouted LPNs are accumulated, the tracking value increases. With each increment, the next offset in the L2P reroute table is selected. Resources of the controller attributed to the originating local domain may also use the tracking value to confirm that enough LPNs have been rerouted to meet a planned threshold of LPNs to be moved.

At 614, the resources of the controller attributed to the originating local domain may place a temporary value in the L2P reroute table (e.g., memory pointer) that points to the buffer where the data for the write command is currently located. For example, with respect to FIG. 4, the resources of the controller 422 attributed to the first local domain 406 may place the temporary value in the L2P reroute table 418.

At 616, the resources of the controller attributed to the originating local domain may pass the write command and the pointer to the data, to the resources of the controller attributed to the receiving domain. For example, with respect to FIG. 4, the resources of the controller 422 attributed to the first local domain 406 may pass the write command and the pointer to the resources of the controller 422 attributed to the eighth local domain 412.

At 618, the resources of the controller attributed to the receiving domain may perform a normal write process of the write command with the buffered data programmed to the physical location in the NAND in the receiving domain. For example, with respect to FIG. 4, the resources of the controller 422 attributed to the eighth local domain 412 may perform the write operation.

At 620, the resources of the controller attributed to the receiving domain may change a value of the reroute table pointing to the buffer data to a physical location of the data in the receiving domain after it has been programmed. For example, with respect to FIG. 4, the resources of the controller 422 attributed to the eighth local domain 412 may change the value of the L2P reroute table 418 to the physical location in the eighth local domain 412.

The above-described process may be performed for all LPNs written to the originating domain until a target number of LPNs is moved to the receiving domain. If the target number of LPNs between domains is not at an acceptable threshold, the methodology repeats for a next write command. After moving the target number of LPNs to the receiving domain, the drive may hold this state of fewer LPNs in the originating domain and more LPNs in the receiving domain for a period of time. During this period of time, there may be writes from the host and GC activity by different drive domains. If wear balance between domains reaches an acceptable threshold, the data may be read out from the receiving domain, buffered, transferred to the originating domain with a buffer pointer, and the originating domain may update the L2P LUT value to a new physical location of the data in the originating domain. Once data is copied from the receiving domain, the receiving domain may mark the data as invalid in its own domain. Thus, the number of LPNs for the originating and receiving domains returns to normal (e.g., an equal number of LPNs in each domain), and the wear between the domains may be more even. The wear between domains may be targeted to keep the wear within an acceptable boundaries or to an overshoot. The trigger for wear balancing may be a larger difference (e.g., 5%) than the trigger for wear balancing termination (e.g., 1%).

Alternatively, if wear leveling is to be terminated, when GC is triggered in the receiving domain, normal GC is performed on most of the data. However, if the data is from the originating domain, the data is buffered and sent to the originating domain with a pointer to the data. This data may be received by the originating domain as a new host write, or it may be processed as GC data. The originating domain may write the data from the buffer to the NAND in either the GC append point or in the incoming host write data stream. The originating domain may respond to the receiving domain that this particular data is programmed to the NAND (or buffered in the originating domain with power fail protection assured). The receiving domain may be able to consider that the LPN moved back to the originating domain and that data as invalid. The GC process may continue without the need to perform GC on that data since it is invalid. The GC process in the receiving domain may avoid a stop and copy process, which is beneficial for performance and does not require and extra write.

Alternatively, if wear leaving is to be terminated, a write command may come in from the host. If the write command resides in the receiving domain, this write command may be used to route the data back into the originating domain and invalidate the data of the receiving domain.

Accordingly, the incorporation of an L2P reroute table into a numbering gap (unused values) of the 32-bit L2P LUT entry has a low impact on read commands, write commands, and GC, with the exception of write commands performed in the process of moving the LPNs, as described above with respect to FIG. 6. Existing memory structures, tracking, and triggers are unaffected. While one additional DRAM read may performed in embodiments described above, this may be avoided by placing the data in an SRAM. However, any increases in RAM may meet normal expectations.

Therefore, a drive with multiple domains may be implemented that balances wear between domains by swapping LPNs between those domains. The LPNs may be swapped within an additional L2P reroute table enabled through unused values in the 32-bit physical meanings of the L2P LUT. The swapped LPNs on the NAND may be signaled as coming from another domain, which enables the GC process to correctly utilize the L2P reroute table. For example, a flag or the utilization of a sparse LPN space may be sufficient for this signaling.

While two domains are described with respect to FIGS. 3 and 4 above, more than one domain pair may be balanced at a time, a domain grouping may map more than one domain with higher wear to a single domain with the least wear, or one domain with higher wear may spread LPNs to more than one domain (e.g., all other domains).

Additionally, if particular LPNs need to be re-routed, they may not be written by the host. LPNs may be re-routed by selecting and moving them through an extra copy operation. LPNs may also be re-routed opportunistically during the GC process. However, the GC may not occur since it is a result of indirect host activity and time bounds may be hit.

Further, a different ordering of segments may be used other than strict sequential ordering. A marker stating "this LPN has been moved" may be used, and the receiving domain may have a slightly larger L2P LUT. The receiving domain may then solve a func (LPN, original domain)=new logical look up value. The receiving domain may have a small number of LPNs from the old domain in the SRAM. The receiving domain may use a different memory structure for the small number of LPNs being transferred (e.g., linked list, b-tree, CAM, and hash table).

According to another embodiment, the numbering gap (unused values) in the 32-bit L2P LUT entry described above may be large enough to fully address all physical locations in the other domain.

A two pass L2P LUT may be decoupled into a source L2P LUT and a concurrent redirect L2P LUT. Domain selection may be shifted to last, and redirection may be identified by a fixed, but unmapped, address. This decoupling may improve latency caused by sequential two-pass redirection mapping for cross domain access, and may improve the limit on reserved PPN entries in a source domain. A high program/erase cycle may be spread to multi-domain via multiple concurrent redirect L2P LUTs, and different redirection IDs that may select different target domains. This spreading may improve target capacity limitations.

A hash function may be used to reduce the doubled size of the L2P LUT by scaling a full LPN to a desirable X-domain-entry number. Hash function conflict detection may be performed by adding the LPN to an X-L2P LUT. Conflict may be resolved via link-list chained entries associated with the same hash function, but this may negatively impact latency.

Instead, conflict resolution latency may be improved by using a double hash function, which employs multiple orthogonal hash functions and concurrent access to find a non-conflict entry. The number of conflicts may be greater than the double hash function count, and a reserved memory may use a content addressable memory (CAM)-based algorithm or sequential search-based algorithm.

Figure 7:
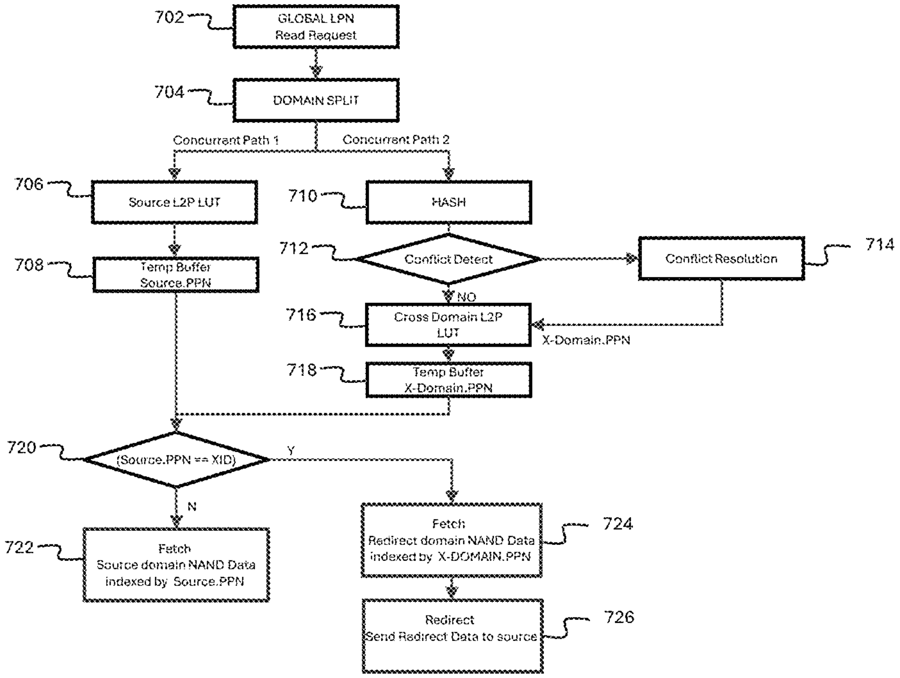
FIG. 7 is a flowchart illustrating domain wear balancing with respect to a read command, according to another embodiment.

FIG. 7 is a flowchart illustrating domain wear balancing with respect to a read command, according to another embodiment. As described above with respect to FIG. 5, a host may submit a read command to a drive, and the drive may fetch and parse a read SQE, translate NS and LBA to LPN, and route the read command to an originating domain. At 702, a drive controller may receive a global LPN for the read command, and may perform concurrent domain path operations, at 704. For example, with respect to FIG. 2, the controller 216 may receive the global LPN for the read command.

Resources of the controller attributed to a source domain may use the LPN to retrieve a source domain PPN via a source domain L2P LUT, at 706. The resources attributed to the source domain may store the source domain PPN may in a temporary buffer, at 708. For example, with respect to FIG. 2, resources of the controller 214 attributed to the first local domain 206 may retrieve the PPN from the L2P LUT 218 and store PPN in the temporary buffer.

Concurrently, the drive controller (e.g., the controller 214 of FIG. 2) may apply a hash function to the LPN, at 710. At 712, the drive controller may determine if a conflict is detected. If a conflict is detected, the drive controller may perform conflict resolution, at 714. Subsequently, the drive controller may use the hash-functioned LPN to determine a cross-domain PPN via a cross-domain L2P LUT, at 716. The drive controller may provide the cross-domain PPN to the temporary buffer, at 718.

At 720, the drive controller (e.g., the controller 214 of FIG. 2) may determine whether the source domain PPN is a cross domain ID. The cross domain ID may be a fixed value identifying cross domain access from a source domain to a redirection domain. If the source domain PPN is not the cross domain ID, the resources of the controller attributed to the source domain may fetch source domain NAND data indexed by the source domain PPN, at 722. For example, with respect to FIG. 2, resources of the controller 214 attributed to the first local domain 206 may fetch NAND data of the first local domain 206.

If the source domain PPN is the cross domain ID, resources of the controller attributed to the redirect domain may fetch redirect domain NAND data indexed by the cross-domain PPN, at 724, and the resources of the controller attributed to the redirect domain may send the redirect domain NAND data to resources of the controller attributed to the source domain, at 726. For example, with respect to FIG. 2, resources of the controller 214 attributed to the eighth local domain 210 may fetch NAND data of the eighth local domain 210, and send the NAND data to the resources of the controller 214 attributed to the first local domain 206.

Figure 8:
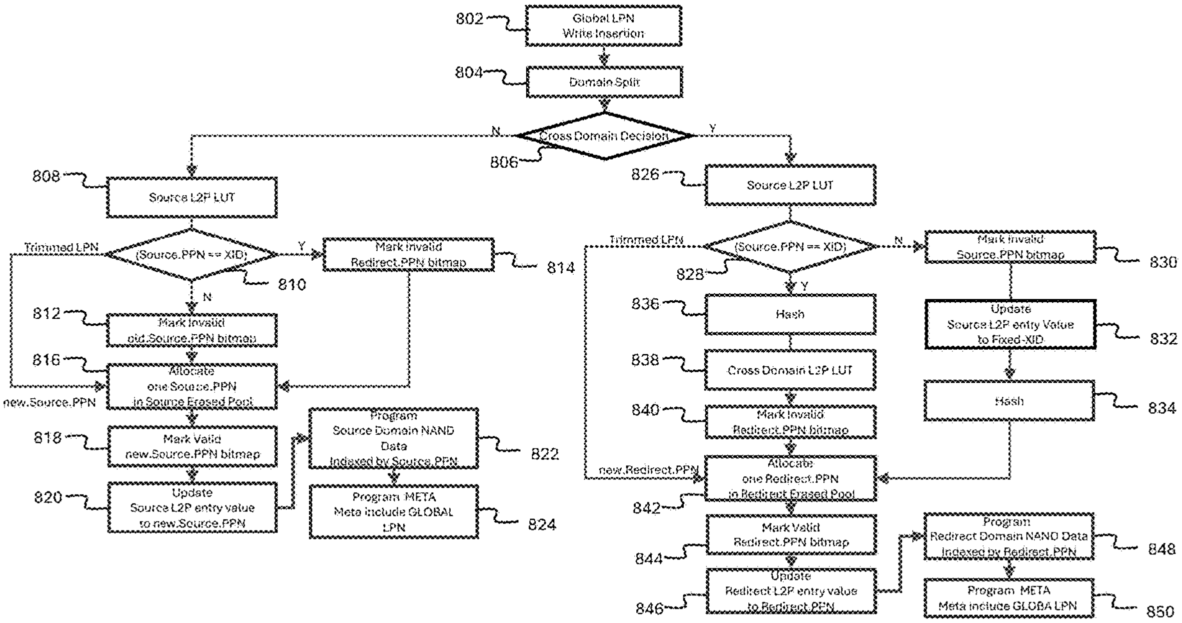
FIG. 8 is a flowchart illustrating domain wear balancing with respect to a write command, according to another embodiment.

FIG. 8 is a flowchart illustrating domain wear balancing with respect to a write command, according to another embodiment. A host may create a write command that would generally be written to the originating domain. As described above with respect to FIG. 6, the host may submit the write command to the drive, and the drive may fetch and parse a write SQE, translate NS and LBA to LPN, and route the write command to the originating domain. At 802, a drive controller may receive a global LPN for a write command, and may perform a domain split, at 804. At 806, the drive controller may determine whether the write command will cross domains. For example, with respect to FIG. 2, the controller 216 may determine with the write command received at the SSD 208 will cross between the first local domain 206 and the eighth local domain 210.

If it is determined that the write command will not cross domains, resources of the drive controller attributed to the source domain may apply the LPN to a source domain L2P LUT to determine a source domain PPN, at 808. For example, with respect to FIG. 2, resources of the controller 216 attributed to the first local domain 206 may determine a PPN from the L2P LUT 218.

At 810, the resources of the drive controller (e.g., the controller 216 of FIG. 2) attributed to the source domain (e.g., the first local domain 206 of FIG. 2) may determine whether the source domain PPN is the cross domain ID. The cross domain ID may be a fixed value identifying cross domain access from a source domain to a redirection domain. If the source domain PPN is not the cross domain ID, the resources of the drive controller attributed to the source domain may mark an old source PPN bitmap as invalid, at 812. If the source domain PPN is the cross domain ID, the resources of the drive controller attributed to the source domain may mark a redirect PPN bitmap as invalid, at 814. Subsequently, at 816, the resources of the drive controller attributed to the source domain may allocate one source domain PPN in a source erase pool using a trimmed LPN.

At 818, the resources of the drive controller (e.g., the controller 216 of FIG. 2) attributed to the source domain (e.g., the first local domain 206 of FIG. 2) may mark a new source domain PPN bitmap as valid. At 820, the resources of the drive controller attributed to the source domain may update a source domain L2P LUT entry value to the new source domain PPN. At 822, the resources of the drive controller attributed to the source domain may program source domain NAND data indexed by the source domain PPN. At 824, the resources of the drive controller attributed to the source domain may program meta data including the global LPN.

Referring back 806, if the write command will cross domains, resources of the drive controller attributed to the source domain may apply the LPN to the source domain L2P LUT to determine the source domain PPN, at 826. For example, with respect to FIG. 2, resources of the controller 216 attributed to the first local domain 206 may determine a PPN from the L2P LUT 218.

At 828, the resources of the drive controller (e.g., the controller 216 of FIG. 2) attributed to the source domain (e.g., the first local domain 206 of FIG. 2) may determine whether the source domain PPN is the cross domain ID. If the source domain PPN is not the cross domain ID, the resources of the drive controller attributed to the source domain may mark a source domain PPN bitmap as invalid at 830, update a source L2P LUT entry value to the fixed cross domain ID at 832, and apply a hash function at 834.

If the source domain is the cross domain ID, the resources of the drive controller (e.g., the controller 216 of FIG. 2) attributed to the redirect domain (e.g., the eighth local domain 210 of FIG. 2) may apply a hash function at 836, use a cross domain L2P LUT to determine an old redirect domain PPN at 838, and mark a redirect domain PPN bitmap as invalid at 840.

At 842, the resources of the drive controller (e.g., the controller 216 of FIG. 2) attributed to the redirect domain (e.g., the eighth local domain 210 of FIG. 2) may allocate one redirect domain PPN in a redirect erase pool. At 844, the resources of the drive controller attributed to the redirect domain may mark a redirect domain PPN bitmap as valid. At 846, the resources of the drive controller attributed to the redirect domain may update a redirect domain L2P LUT entry value to a redirect PPN. At 848, the resources of the drive controller attributed to the redirect domain may program redirect domain NAND data indexed by the redirect domain PPN. At 850, the resources of the drive controller attributed to the redirect domain may program meta data including the global LPN.

GC may use the same host write. A GC-read may be based on PPN, and a GC-write insertion may be before the domain-splitter (e.g., 804 of FIG. 8). The global-LPN may be programmed as meta information in NAND with data.

Accordingly, a wear level may be balanced by cross domain read and write commands. A redirected read decision may be deferred until source domain L2P lookup is completed. Concurrent independent source domain L2P LUT and redirect L2P LUT reduce redirection latency. A fixed ID may be used as a value in source domain L2P LUT table entries to identify cross-domain access from one source-domain to one redirection domain. Multiple fixed IDs may be used as values in the source L2P LUT entries to identify cross-domain access from one source domain to multiple redirection domains. HASH global LPN may be used as a redirection domain L2P LUT index/key so that an L2P LUT entry count may match a cross-domain size requirement. Classical next-link may be applied to resolve hash conflict. A double-hash function may be applied to reduce conflict-resolution-latency. The global LPN may be programmed in meta data of the NAND so that a GC-write is the same as a host-write.

Figure 9:
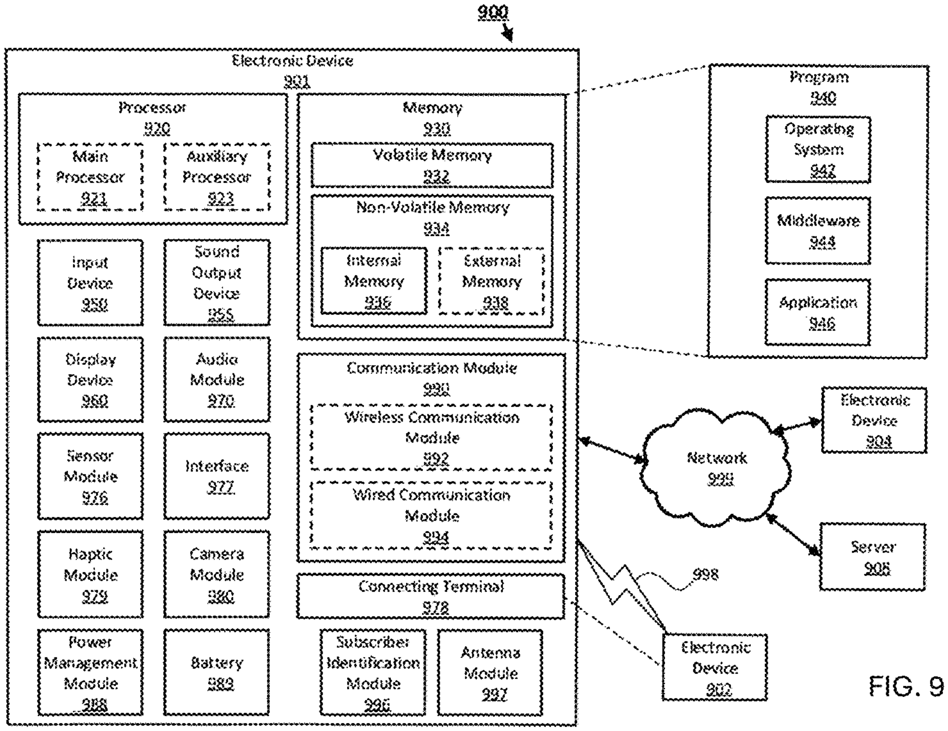
FIG. 9 is a block diagram of an electronic device in a network environment for processing commands, according to an embodiment.

FIG. 9 is a block diagram of an electronic device in a network environment 900 for processing commands, according to an embodiment. This electronic device may be one of various types of electronic devices that utilizes storage devices described above in FIGS. 1 and 6.

Referring to FIG. 9, an electronic device 901 in a network environment 900 may communicate with an electronic device 902 via a first network 998 (e.g., a short-range wireless communication network), or an electronic device 904 or a server 908 via a second network 999 (e.g., a long-range wireless communication network). The electronic device 901 may communicate with the electronic device 904 via the server 908. The electronic device 901 may include a processor 920, a memory 930, an input device 950, a sound output device 955, a display device 960, an audio module 970, a sensor module 976, an interface 977, a haptic module 979, a camera module 980, a power management module 988, a battery 989, a communication module 990, a subscriber identification module (SIM) card 996, or an antenna module 997. In one embodiment, at least one (e.g., the display device 960 or the camera module 980) of the components may be omitted from the electronic device 901, or one or more other components may be added to the electronic device 901. Some of the components may be implemented as a single integrated circuit (IC). For example, the sensor module 976 (e.g., a fingerprint sensor, an iris sensor, or an illuminance sensor) may be embedded in the display device 960 (e.g., a display).

The processor 920 may execute software (e.g., a program 940) to control at least one other component (e.g., a hardware or a software component) of the electronic device 901 coupled with the processor 920 and may perform various data processing or computations.

As at least part of the data processing or computations, the processor 920 may load a command or data received from a host or another component (e.g., the sensor module 976 or the communication module 990) in volatile memory 932, process the command or the data stored in the volatile memory 932, and store resulting data in non-volatile memory 934. The processor 920 may include a main processor 921 (e.g., a central processing unit (CPU) or an application processor (AP)), and an auxiliary processor 923 (e.g., a graphics processing unit (GPU), an image signal processor (ISP), a sensor hub processor, or a communication processor (CP)) that is operable independently from, or in conjunction with, the main processor 921. Additionally or alternatively, the auxiliary processor 923 may be adapted to consume less power than the main processor 921, or execute a particular function. The auxiliary processor 923 may be implemented as being separate from, or a part of, the main processor 921.

The auxiliary processor 923 may control at least some of the functions or states related to at least one component (e.g., the display device 960, the sensor module 976, or the communication module 990) among the components of the electronic device 901, instead of the main processor 921 while the main processor 921 is in an inactive (e.g., sleep) state, or together with the main processor 921 while the main processor 921 is in an active state (e.g., executing an application). The auxiliary processor 923 (e.g., an image signal processor or a communication processor) may be implemented as part of another component (e.g., the camera module 980 or the communication module 990) functionally related to the auxiliary processor 923.

The memory 930 may store various data used by at least one component (e.g., the processor 920 or the sensor module 976) of the electronic device 901. The various data may include, for example, software (e.g., the program 940) and input data or output data for a command related thereto. The memory 930 may include the volatile memory 932 or the non-volatile memory 934. Non-volatile memory 934 may include internal memory 936 and/or external memory 938. The memory 930 may be embodied as the storage device 94 of FIG. 1.

The program 940 may be stored in the memory 930 as software, and may include, for example, an operating system (OS) 942, middleware 944, or an application 946.

The input device 950 may receive a command or data to be used by another component (e.g., the processor 920) of the electronic device 901, from the outside (e.g., a user) of the electronic device 901. The input device 950 may include, for example, a microphone, a mouse, or a keyboard.

The sound output device 955 may output sound signals to the outside of the electronic device 901. The sound output device 955 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 960 may visually provide information to the outside (e.g., a user) of the electronic device 901. The display device 960 may include, for example, a display, a hologram device, or a projector and control circuitry to control a corresponding one of the display, hologram device, and projector. The display device 960 may include touch circuitry adapted to detect a touch, or sensor circuitry (e.g., a pressure sensor) adapted to measure the intensity of force incurred by the touch.

The audio module 970 may convert a sound into an electrical signal and vice versa. The audio module 970 may obtain the sound via the input device 950 or output the sound via the sound output device 955 or a headphone of an external electronic device 902 directly (e.g., wired) or wirelessly coupled with the electronic device 901.

The sensor module 976 may detect an operational state (e.g., power or temperature) of the electronic device 901 or an environmental state (e.g., a state of a user) external to the electronic device 901, and then generate an electrical signal or data value corresponding to the detected state. The sensor module 976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 977 may support one or more specified protocols to be used for the electronic device 901 to be coupled with the external electronic device 902 directly (e.g., wired) or wirelessly. The interface 977 may include, for example, a high-definition multimedia interface (HDMI), a universal serial bus (USB) interface, a secure digital (SD) card interface, or an audio interface.

A connecting terminal 978 may include a connector via which the electronic device 901 may be physically connected with the external electronic device 902. The connecting terminal 978 may include, for example, an HDMI connector, a USB connector, an SD card connector, or an audio connector (e.g., a headphone connector).

The haptic module 979 may convert an electrical signal into a mechanical stimulus (e.g., a vibration or a movement) or an electrical stimulus which may be recognized by a user via tactile sensation or kinesthetic sensation. The haptic module 979 may include, for example, a motor, a piezoelectric element, or an electrical stimulator.

The camera module 980 may capture a still image or moving images. The camera module 980 may include one or more lenses, image sensors, image signal processors, or flashes. The power management module 988 may manage power supplied to the electronic device 901. The power management module 988 may be implemented as at least part of, for example, a power management integrated circuit (PMIC).

The battery 989 may supply power to at least one component of the electronic device 901. The battery 989 may include, for example, a primary cell which is not rechargeable, a secondary cell which is rechargeable, or a fuel cell.

The communication module 990 may support establishing a direct (e.g., wired) communication channel or a wireless communication channel between the electronic device 901 and the external electronic device (e.g., the electronic device 902, the electronic device 904, or the server 908) and performing communication via the established communication channel. The communication module 990 may include one or more communication processors that are operable independently from the processor 920 (e.g., the AP) and supports a direct (e.g., wired) communication or a wireless communication. The communication module 990 may include a wireless communication module 992 (e.g., a cellular communication module, a short-range wireless communication module, or a global navigation satellite system (GNSS) communication module) or a wired communication module 994 (e.g., a local area network (LAN) communication module or a power line communication (PLC) module). A corresponding one of these communication modules may communicate with the external electronic device via the first network 998 (e.g., a short-range communication network, such as BLUETOOTH™, wireless-fidelity (Wi-Fi) direct, or a standard of the Infrared Data Association (IrDA)) or the second network 999 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 992 may identify and authenticate the electronic device 901 in a communication network, such as the first network 998 or the second network 999, using subscriber information (e.g., international mobile subscriber identity (IMSI)) stored in the subscriber identification module 996.

The antenna module 997 may transmit or receive a signal or power to or from the outside (e.g., the external electronic device) of the electronic device 901. The antenna module 997 may include one or more antennas, and, therefrom, at least one antenna appropriate for a communication scheme used in the communication network, such as the first network 998 or the second network 999, may be selected, for example, by the communication module 990 (e.g., the wireless communication module 992). The signal or the power may then be transmitted or received between the communication module 990 and the external electronic device via the selected at least one antenna.

Commands or data may be transmitted or received between the electronic device 901 and the external electronic device 904 via the server 908 coupled with the second network 999. Each of the electronic devices 902 and 904 may be a device of a same type as, or a different type, from the electronic device 901. All or some of operations to be executed at the electronic device 901 may be executed at one or more of the external electronic devices 902, 904, or 908. For example, if the electronic device 901 should perform a function or a service automatically, or in response to a request from a user or another device, the electronic device 901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 901. The electronic device 901 may provide the outcome, with or without further processing of the outcome, as at least part of a reply to the request. To that end, a cloud computing, distributed computing, or client-server computing technology may be used, for example.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method comprising:

receiving a command at a controller of a storage device, wherein a logical capacity of the storage device is split into domains;

determining, by the controller, a logical address associated with the command, wherein the logical address is associated with a first domain of the storage device; and rerouting the command from first resources of the controller attributed to the first domain to second resources of the controller attributed to a second domain of the storage device, based on a physical address associated with the logical address.

2. The method of claim 1, wherein the physical address is an invalid physical page number (PPN) retrieved from a first logical-to-physical (L2P) look-up table (LUT) of the first domain, wherein rerouting the command comprises rerouting a logical page number (LPN) from the first L2P LUT to a second L2P LUT of the second domain, and wherein the first domain has more wear than the second domain.

3. The method of claim 2, further comprising:

configuring an L2P reroute table with portions of L2P LUT entries that are unused in defining PPNs, wherein the L2P reroute table tracks the LPNs routed from the first L2P LUT to the second L2P LUT.

4. The method of claim 3, wherein the LPNs are indicated as rerouted by a flag that enables the second resources of the controller attributed to the second domain to retrieve a physical location from the L2P reroute table.

5. The method of claim 3, wherein the command comprises a read command routed to the first resources of the controller attributed to the first domain, and performing the command comprises:

determining, based on the read command, that a PPN value from the first L2P LUT is invalid;

determining an offset in the L2P reroute table by subtracting a last valid PPN value in the first domain from the PPN value; and determining a new PPN value based on the offset in the L2P reroute table, wherein the new PPN value is a physical location in the second domain.

6. The method of claim 3, wherein the command comprises a garbage collection command routed to the first resources of the controller attributed to the first domain, and performing the command comprises:

triggering garbage collection across a superblock of the first domain;

reading valid LPNs and writing the valid LPNs to a new superblock; and updating L2P information in the first L2P LUT and the L2P reroute table.

7. The method of claim 3, wherein the command comprises a write command routed to the first resources of the controller attributed to the first domain, and performing the command comprises:

buffering data of the write command;

determining, based on the write command, that a PPN value from the first L2P LUT indicates rerouting to the second domain and a physical location in the second domain; and sending the write command and the buffered data to the second resources of the controller attributed to the second domain.

8. The method of claim 3, wherein the command comprises a write command routed to the first resources of the controller attributed to the first domain, and performing the command comprises:

buffering data of the write command;

invaliding a physical location indicated in the first L2P LUT based on the write command;

updating the physical location based on a value of the L2P reroute table;

attributing a temporary value to the L2P reroute table that points to the buffered data of the write command;

passing the write command and the temporary value from the first resources of the controller attributed to the first domain to the second resources of the controller attributed to the second domain;

performing the write command by sending the buffered data to the second resources of the controller attributed to the second domain; and changing the temporary value of the L2P reroute table to a physical location of the data in the second domain.

9. The method of claim 2, further comprising:

configuring a redirect L2P LUT, wherein performing the command comprises concurrent use of the first L2P LUT and the redirect L2P LUT.

10. The method of claim 9, wherein a first PPN entry of the first L2P LUT comprises a first cross domain identifier (ID) identifying cross domain access to the second domain.

11. The method of claim 10, wherein a second PPN entry of the first L2P LUT comprises a second cross domain identifier (ID) identifying cross domain access to a third domain of the domains.

12. The method of claim 9, further comprising:

performing a hash function on an LPN of the command to scale down the LPN for an entry of the redirect L2P LUT.

13. The method of claim 1, wherein:

the first resources comprise first hardware and firmware resources dedicated to the first domain, and the second resources comprise separate second hardware and firmware resources dedicated to the second domain; or the first resources and the second resources comprise hardware and firmware resources used on a rotating basis between the first domain and the second domain.

14. A storage device, comprising:

a controller; and a non-transitory computer readable storage medium having a logical capacity split into domains and storing instructions that, when executed, cause the controller to:

receive a command;

determine a logical address associated with the command, wherein the logical address is associated with a first domain; and reroute the command from first resources of the controller attributed to the first domain to second resources of the controller attributed to a second domain, based on a physical address associated with the logical address.

15. The storage device of claim 14, wherein the physical address is an invalid physical page number (PPN) retrieved from a first logical-to-physical (L2P) look-up table (LUT) of the first domain, wherein rerouting the command comprises rerouting a logical page number (LPN) from the first L2P LUT to a second L2P LUT of the second domain, and wherein the first domain has more wear than the second domain.

16. The storage device of claim 15, wherein the instructions further cause the controller to:

configure an L2P reroute table with portions of L2P LUT entries that are unused in defining PPNs, wherein the L2P reroute table tracks the LPNs routed from the first L2P LUT to the second L2P LUT.

17. The storage device of claim 16, wherein the LPNs are indicated as rerouted by a flag that enables the second resources of the controller attributed to the second domain to retrieve a physical location from the L2P reroute table.

18. The storage device of claim 15, wherein the instructions further cause the controller to:

configure a redirect L2P LUT, wherein performing the command comprises concurrent use of the first L2P LUT and the redirect L2P LUT, and wherein a first PPN entry of the first L2P LUT comprises a first cross domain identifier (ID) identifying cross domain access to the second domain.

19. The storage device of claim 18, wherein a second PPN entry of the first L2P LUT comprises a second cross domain identifier (ID) identifying cross domain access to a third domain of the domains.

20. The storage device of claim 18, wherein the instructions further cause the controller to:

perform a hash function on an LPN of the command to scale down the LPN for an entry of the redirect L2P LUT.

* * * * *